| United States Patent [19] | [11] 3,903,900 |
| Wolt et al. | [45] Sept. 9, 1975 |

[54] TOBACCO ARTICLES AND COMPOSITIONS CONTAINING 1,2-CYCLOHEXANEDIONE AND METHODS FOR PRODUCING SAME

[75] Inventors: John Wolt, Freehold; Christopher Giacino, Califon, both of N.J.; Alton Dewitt Quinn, Calicoon; Edward J. Shuster, Brooklyn, both of N.Y.; Joaquin F. Vinals, Red Bank, N.J.

[73] Assignee: International Flavors & Fragrances Inc., New York, N.Y.

[22] Filed: Oct. 15, 1974

[21] Appl. No.: 515,066

Related U.S. Application Data

[63] Continuation-in-part of Ser. No. 359,679, May 14, 1973, Pat. No. 3,875,307.

[52] U.S. Cl. ............................. 131/17 R; 131/144
[51] Int. Cl.$^2$ ................................. A24B 15/04
[58] Field of Search ............. 131/2, 15, 9, 17, 144

[56] References Cited
UNITED STATES PATENTS

| 3,306,303 | 2/1967 | Bavley et al. | 131/144 X |
| 3,730,189 | 5/1973 | Rhode | 131/17 R |
| 3,746,010 | 7/1973 | Leffingwell | 131/17 R |
| 3,782,973 | 1/1974 | Pittet et al. | 131/17 R |
| 3,840,023 | 10/1974 | Demole | 131/17 R |

*Primary Examiner*—Melvin D. Rein
*Attorney, Agent, or Firm*—Arthur L. Liberman, Esq.; Harold Haidt, Esq.

[57] ABSTRACT

Methods for preparing tobacco compositions, flavoring compositions for tobaccos and tobacco articles by including therein 1,2-cyclohexanedione and, optionally, in addition, other cyclic di-ketones such as maltol, cyclotene and 2,5-dimethyl-4-hydroxy-3(2H)-furanone to produce a maple and spicey note and more natural sweet tobacco note, or to enhance the flavor and fragrance note imparted by other cyclic di-ketones such as maltol, cyclotene, and 2,5-dimethyl-4-hydroxy-3(2H)-furanone as well as the tobacco compositions containing 1,2-cyclohexanedione and, optionally, in addition, other cyclic di-ketones such as maltol, cyclotene and 2,5-dimethyl-4-hydroxy-3(2H)-furanone.

9 Claims, No Drawings

TOBACCO ARTICLES AND COMPOSITIONS CONTAINING 1,2-CYCLOHEXANEDIONE AND METHODS FOR PRODUCING SAME

This application is a continuation-in-part of U.S. application for Letters Patent Ser. No. 359,679 filed on May 14, 1973, now U.S. Pat. No. 3,875,307.

BACKGROUND OF THE INVENTION

The present invention relates to novel methods and compositions using 1,2-cyclohexanedione and, optionally, in addition, other cyclic di-ketones such as maltol, cyclotene and 2,5-dimethyl-4-hydroxy-3(2H)-furanone to alter the flavor and/or aroma of tobacco and tobacco articles.

There has been considerable work performed relating to substances which can be used to impart (or enhance) flavors to (or in) various consumable materials. These substances are used to diminish natural materials, some of which may be in short supply, and to provide more uniform properties in the finished product. Sweet, burnt licorice, "Cyclotene" flavors and "Finochio" or fennel flavors are particularly desirable for many uses in consumable articles, e.g., tobacco products such as cigars and cigarettes. Maple/coumarin notes are particularly desirable in tobacco.

The valuable flavor material commonly known as cyclotene, or methyl cyclopentenolone (3-methylcyclopentan-1,2-dione) having the structure:

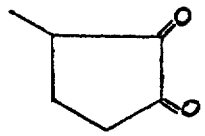

is described by Arctander in "Perfume and Flavor Chemicals" as having a "sweet and very powerful, caramellic-spicy odor . . . walnut-maple-licorice-celery-tobacco . . . particularly when studied in the undiluted state . . . the taste is intensely sweet, warm, slightly spicy, root-like, walnut-celery-like with licorice-root and maplesugar as the most common words of description . . . is used sparingly in perfume compositions often in combination with coumarin or coumarin derivatives. It is an excellent fortifier for such materials in lavender fragrances, new mown hay, "tabac" type fragrances, spicy bases, . . . falls naturally into celery seed oil, lovage, fenugreek, tonka, liatris, flouve . . ." (Reference 1987 Of Arctander, Valumn II). The textbook, "Chemistry and Physiology of Flavors" by Schultz, Day and Libbey at pages 442 and 443 states that such compounds as -methyl-cyclopentan-3-methyl-cyclopentan-1,2-dione; 3,4-dimethylcyclopentan-1,2-dione; 3,5-dimethylcyclopentan-1,2-dione; 3-ethylcyclopentan-1,2-dione and 3-methylcyclohexan-1,2-dione having the structure:

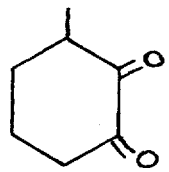

are present in the aroma of coffee. In a paper entitled "Flavor Properties of Compounds Related to Maltol and Isomaltol" by Pittet et al. In Agricultural and Food Chemistry, Volumn 18, No. 5, pages 929, September/October 1970, the compound, 2-hydroxy-3,5-dimethyl-2-cyclohexan-1-one having the structure:

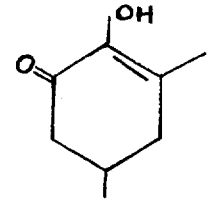

is set forth as having a charred wood, phenolic sweet note with a saffron, caramel, astringent taste. It is noteworthy that the structure of this material can also be written thus:

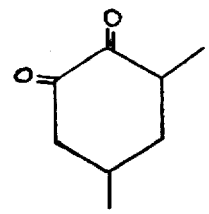

By the same token, the 1,2-cyclohexanedione which is 100% "enolized" (See "Organic Reaction Mechanisms" Breslow, W.A. Benjamin Inc., New York, 1969 at pp. 174-179) can be written thusly:

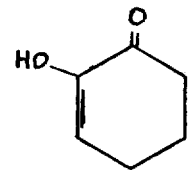

1,2-Cyclohexanedione is prepared according to a process set forth in Japanese Pat. No. 2617 issued on Feb. 19, 1966 and applied for on Mar. 29, 1963 (See Chem. Abstracts, Volumn 64, 1966, No. 14134h). In U.S. Pat. No. 3,505,327, 4-methylcyclohexane-1,2-dione was prepared as an intermediate by the $FeCl_3$ oxidation route. When 50 parts of 4-methylcyclohexanone are brominated in aqueous acetic acid and worked-up, 84 parts of 2-bromo-4-methylcyclohexanone are obtained as an oil. This oil is then hydrolyzed in water at 95°C for 10 minutes and oxidized with $FeCl_3$ at 95°C for 20 minutes. On workup, 59.2 parts of 4-methylcyclohexane-1,2-dione are obtained as a dark oil. Similarly, 1,2-cyclohexanedione is prepared using cyclohexanone as a starting material in place of 4-methylcyclohexane-1,2-dione, thus:

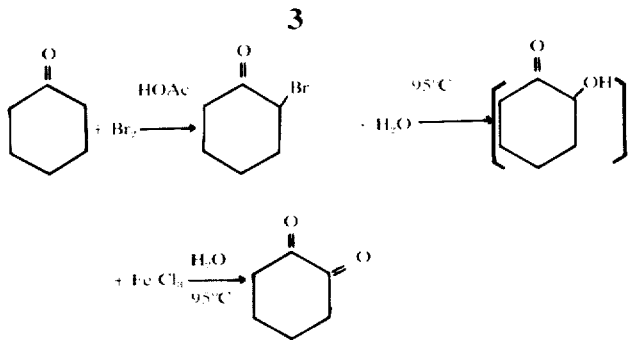

See Dutch Pat. No. 58,279, Sept. 16, 1946.

THE INVENTION

It has now been discovered that novel solid and liquid tobacco flavoring compositions (for use, interalia, in the fabrication of tobacco articles) having sweet burnt notes reminiscent of licorice and cyclotene and which can be described as sweet caramel, and maple-like; and novel tobacco aroma imparting compositions having maple, black walnut and foenugreek character; as well as tobacco or tobacco substitute compositions having maple/cowmarin notes may be provided by the utilization of 1,2-cyclohexanedione alone or in combination with such di-ketones as maltol, cyclotene, and 2,5-dimethyl-4-hydroxy-3(2H)-furanone. Thus, the 1,2-cyclohexanedione of our invention is capable of supplying and/or potentiating certain flavor and aroma notes usually lacking in many licorice-type tobacco flavors heretofore provided. The intense foenugreek character of 1,2-cyclohexanedione is unexpected in view of the relatively weaker foenugreek character of its isomers, such as cyclotene.

It has been found that the tobacco additives of our invention when incorporated into tobacco products impart a flavor and aroma both before and during smoking which many smokers consider to be desirable in smoking products. However, it is pointed out that the methods for defining or characterizing the quality of a flavor or aroma in the tobacco art are almost purely subjective and different smokers may define the same flavor quite differently. Also, the 1,2-cyclohexanedione and, optionally, other cyclic di-ketones, such as maltol, cyclotene and 2,5-dimethyl-4-hydroxy-3(2H)-furanone included within the broad scope of this invention may impart different flavors or aromas depending upon the mole ratio of different di-ketones therein. Thus, the compounds comprehended by this invention, by subjective tests, impart characteristic flavors which are desirable in tobacco products and the smoke therefrom even though the exact character thereof cannot be described on the basis of known standards.

In accordance with this invention, 1,2-cyclohexanedione is used to impart a sweet more natural tobacco character and a maple and spicey note to a standard maple flavor used in tobacco when used at levels of 500–1,000 parts per million (when used with other cyclic di-ketones) and from 1,000 to 6,000 parts per million (when used alone) based on the dry weight of the tobacco. However, the amount used will depend upon the amount of flavor and aroma desired and the particular compound or mixture thereof that is used. The 1,2-cyclohexanedione and, optionally, other cyclic di-ketones, such as maltol, cyclotene and 2,5-dimethyl-4-hydroxy-3(2H)-furanone may be incorporated at any step in the treatment of the tobacco but this composition of matter is preferably added after aging, curing and shredding and before the tobacco is formed into cigarettes. Likewise, it will be apparent that only a portion of the tobacco need be treated and the thus treated tobacco may be blended with other tobaccos before the cigarettes or other smoking articles are formed. In such case, the tobacco treated may have the additive in excess of the amounts above indicated so that when blended with other tobaccos the final product will have the percentage within the indicated range.

In accordance with one specific embodiment of this invention, an aged, flue-cured and shredded tobacco is sprayed with a 1% ethyl alcohol solution of 1,2-cyclohexanedione in an amount to provide a tobacco containing 2,000 ppm. by weight of the additive on a dry basis. Thereafter, the alcohol is removed by evaporation and the tobacco is manufactured into cigarettes by the usual techniques. It has been found that the cigarette when prepared as indicated has a desired and pleasing flavor, an aroma which to some people is described as "sweet maple-like" with licorice nuances and is detectable and pleasing in the main and side smoke streams when the cigarette is smoked.

The additives falling within the scope of this invention may be applied to the tobacco by spraying, dipping or otherwise, utilizing suitable suspensions or solutions of the additive. Thus water or volatile organic solvents, such as alcohol, ether, acetone, volatile hydrocarbons and the like, may be used as the carrying medium for the additive while it is being applied to the tobacco. Also, other flavor-and-aroma-producing additives, such as:

a. Esters, for example:
   Ethyl butyrate;
   Ethyl acetate;
   Ethyl valerate;
   Amyl acetate;
   Phenyl ethyl isovalerate; and
   Methyl heptynyl Cloves;
b. Aldehydes, for example:
   3-phenyl-2-pentenal;
   3-phenyl-3-pentenal;
   phenyl acetaldehyde;
   Cinnamaldehyde; and
   Beta-ethyl-cinnamaldehyde
c. Ketones, for example:
   Benzylidene acetone;
   Acetophenone;
   Maltol; and
   Ethyl maltol
d. Acetals, for example:
   3phenyl-4-pentenal dimethyl acetal; and
   3-phenyl-4-pentenal diethyl acetal (described in copending application for U.S. Lets. Pat. No. 276,922 filed on Aug. 1, 1972)
e. Natural oils and extracts, for example:
   Vanilla;

Coffee extract;
Origanum oil;
Cocoa Extract;
Oil of Cloves;
Nutmeg Oil;
Celery Seed Oil;
Bergamot oil; and
Ylang-ylang oil f. Lactones, for example:
Delta-decalactone;
Delta-undecalactone;
Delta-dodecalactone;
Gamma-undecalacetone; and
Coumarin g. Ethers, for example:
Dibenzyl ether;
Vanillin; and
Eugenol h. Pyrazines, for example:
2-Acetyl pyrazine;
2-Acetyl-6-methyl pyrazine;
2-Ethyl pyrazine;
2,3-Dimethyl pyrazine;
2,5-Dimethyl pyrazine; and
2-Ethyl-5-methyl pyrazine i. Pyrroles, for example:
N-cyclopropyl pyrrole; and
N-cyclooctyl pyrrole as well as those additives disclosed in U.S. Pat. Nos. 2,766,145, 2,905,575, 2,905,576, 2,978,365, 3,041,211, 2,766,149, 2,766,150, 3,589,372, 3,288,146, 3,402,051 and 3,380,457 as well as Australian Pat. Nos. 444,545, 444,507 and 444,389 may be incorporated into the tobacco with the 1,2-cyclohexanedione and, optionally, other cyclic di-ketones, such as maltol, cyclotene and 2,5-dimethyl-4-hydroxy-3(2H)-furanone of this invention.

While this invention is principally useful in the manufacture of cigarette tobacco, it is also suitable for use in connection with the manufacture of pipe tobacco, cigars or other tobacco products. Furthermore, the compounds may be added to certain tobacco substituents of natural or synthetic origin.

"Tobacco," as used herein includes natural tobaccos, such as burley, Turkish tobacco, Maryland tobacco, tobacco-like products, such as reconstituted tobacco of homogenized tobacco. The disclosed additives also may be used with tobacco subsitutes which are intended to replace natural tobacco. Various vegetable leaves such as lettuce and cabbage leaves fall into this category.

Although our invention has been particularly described with reference to the addition of the 1,2-cyclohexanedione and, optionally, other cyclic di-ketones, such as maltol, cyclotene and 2,5-dimethyl-4-hydroxy-3-(2H)-furanone directly to tobacco, it will be apparent that the 1,2-cyclohexanedione and, optionally, other cyclic di-ketones, such as maltol, cyclotene and 2,5-dimethyl-4-hydroxy-3(2H)-furanone may be applied to the paper of the cigarette or to the wrapper of a cigar. Also, the 1,2-cyclohexanedione and, optionally, other cyclic di-ketones, such as maltol, cyclotene and 2,5-dimethyl-4-hydroxy-3(2H)-furanone be incorporated into the filter tip, the packaging material or the seam paste employed for gluing the cigarette paper. Thus, a tobacco product is provided which includes the specified additives and tobacco although in every instance 1,2-cyclohexanedione and, optionally, other cyclic di-ketones, such as maltol, cyclotene and 2,5-dimethyl-4-hydroxy-3(2H)-furanone need not be admixed with the tobacco as above specificially described.

The following example is given to illustrate the embodiments of the invention as it is presently preferred to practice it. It will be understood that this example is illustrative and the invention is not to be considered as restricted thereto except as indicated in the appended claims.

EXAMPLE I

Tobacco Flavoring Formulation and Incorporation Thereof into Cigarettes

A tobacco flavoring formulation is prepared by admixing the following ingredients:

| Ingredients | Parts by Weight |
| --- | --- |
| Ethyl Butyrate | 0.05 |
| Ethyl Valerate | 0.05 |
| Maltol | 2.00 |
| Cocoa Extract | 26.00 |
| Coffee Extract | 10.00 |
| Ethanol | 20.00 |
| Water | 41.90 |

The above formulation is added to smoking tobacco (bright, burley, Turkish, homogenized tobacco) at the rate of 1–3% by weight of the tobacco. The tobacco is then formulated into cigarettes by the usual manufacturing procedures:

i. At the rate of 1,000 part per million, to each cigarette, is added 1,2-cyclohexanedione. The use of the 1,2-cyclohexanedione enhances the natural tobacco character causing the tobacco to have a sweeter taste and aroma on smoking.

ii. At the rate of 6,000 part per million, to each cigarette, is added 1,2-cyclohexanedione. The use of the 1,2-cyclohexanedione causes the tobacco to have a distinct and natural maple and spicey note prior to smoking and on smoking.

iii. At the rate of 500 part per million of 1,2-cyclohexanedione and 500 part per million of cyclotene, a 50-50 (weight-weight) mixture of 1,2-cyclohexanedione and cyclotene is added to each cigarette. The use of this mixture enhances the natural tobacco character causing the tobacco to have a sweeter taste and aroma on smoking. The effect of using this mixture of 1,2-cyclohexanedione and cyclotene is considered to be synergistic.

What is claimed is:

1. A process for altering the organoleptic properties of tobacco which comprises adding thereto a small but effective amount of 1,2-cyclohexanedione.

2. A tobacco composition comprising tobacco and a flavor modifying amount of 1,2-cyclohexanedione.

3. A tobacco composition comprising tobacco and a flavor modifying amount of a mixture of 1,2-cyclohexanedione and a second cyclic di-ketone.

4. The tobacco composition of claim 3 wherein the second cyclic di-ketone is selected from the group consisting of cyclotene, maltol, and 2,5-dimethyl-4-hydroxy-3(2H)-furanone.

5. The composition of claim 4 wherein the second cyclic di-ketone is cyclotene.

6. A tobacco product having added thereto an amount sufficient to alter the flavor or aroma of the tobacco product of 1,2-cyclohexanedione.

7. The tobacco product of claim 6 wherein the concentration of 1,2-cyclohexanedione in the tobacco product is from 1,000–5,000 parts per million, based on the total weight of tobacco on a dry basis.

8. The tobacco product of claim 6 having additionally added thereto a second cyclic di-ketone.

9. The tobacco product of claim 8 wherein the second cyclic di-ketone is selected from the group consisting of cyclotene, maltol and 2,5-dimethyl-4-hydroxy-3(2H)-furanone.

* * * * *